(Model.)

8 Sheets—Sheet 1.

G. J. CAPEWELL.
HORSESHOE NAIL MACHINE.

No. 292,201. Patented Jan. 22, 1884.

Witnesses.
Robert Emmett
George Tilghman

Inventor,
George J. Capewell,
By Wm H Babcock
Atty.

(Model.)

8 Sheets—Sheet 2.

G. J. CAPEWELL.
HORSESHOE NAIL MACHINE.

No. 292,201. Patented Jan. 22, 1884.

Witnesses.
Robert Everett
George Tilghman

Inventor.
George J. Capewell.
By Wm H Babcock
Atty.

(Model.) 8 Sheets—Sheet 3.

G. J. CAPEWELL.
HORSESHOE NAIL MACHINE.

No. 292,201. Patented Jan. 22, 1884.

Witnesses.
Robert Everett,
George Tilghman

Inventor.
George J. Capewell,
By Wm H Babcock
Atty.

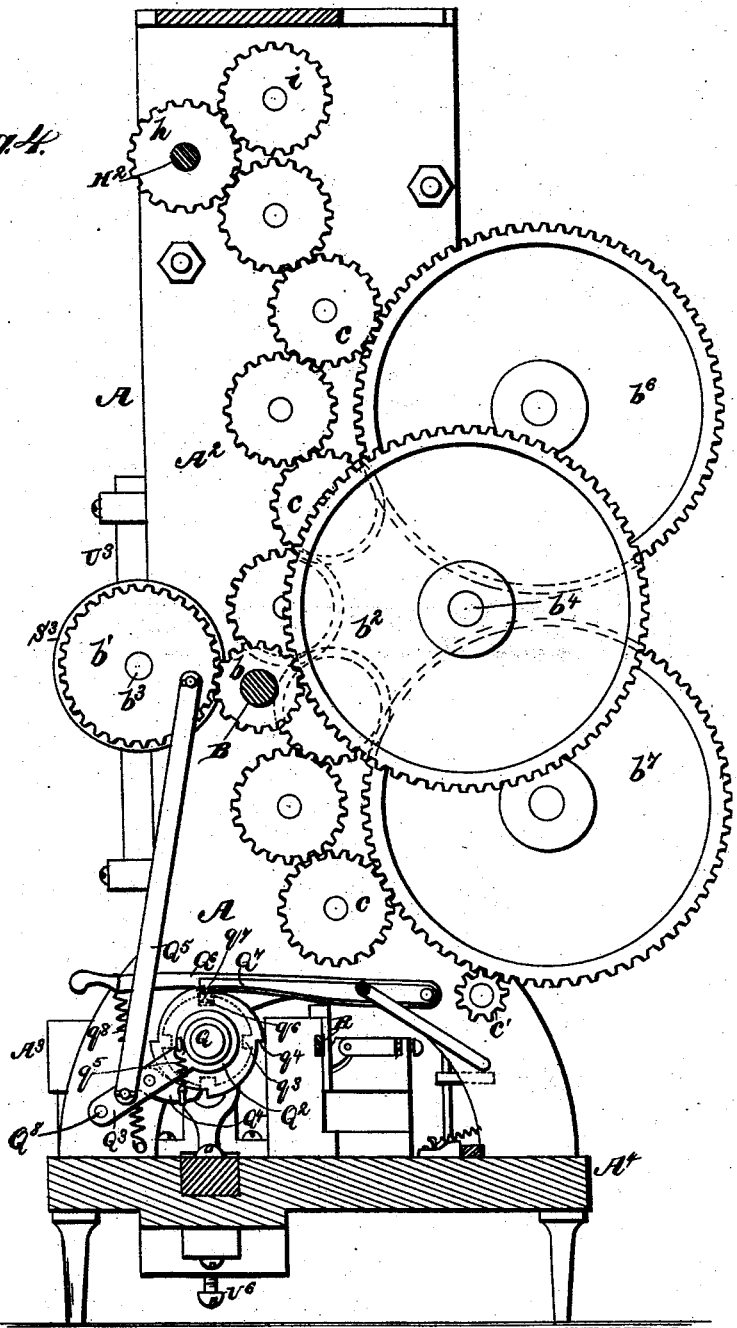

(Model.) 8 Sheets—Sheet 5.
G. J. CAPEWELL.
HORSESHOE NAIL MACHINE.
No. 292,201. Patented Jan. 22, 1884.
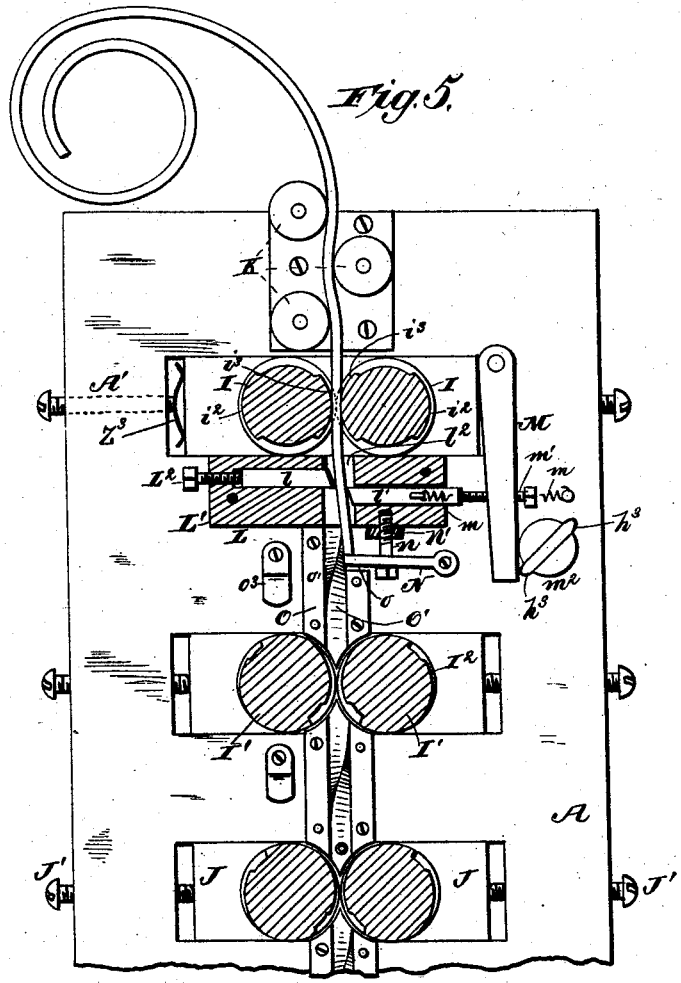
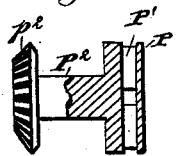
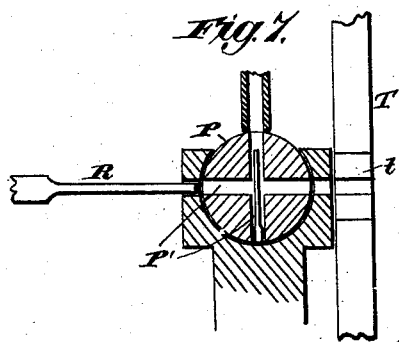
Witnesses.
Robert Everett
George Tilghman
Inventor:
George J. Capewell,
By W. H. Babcock
Atty.

(Model.)
G. J. CAPEWELL.
HORSESHOE NAIL MACHINE.
No. 292,201. Patented Jan. 22, 1884.
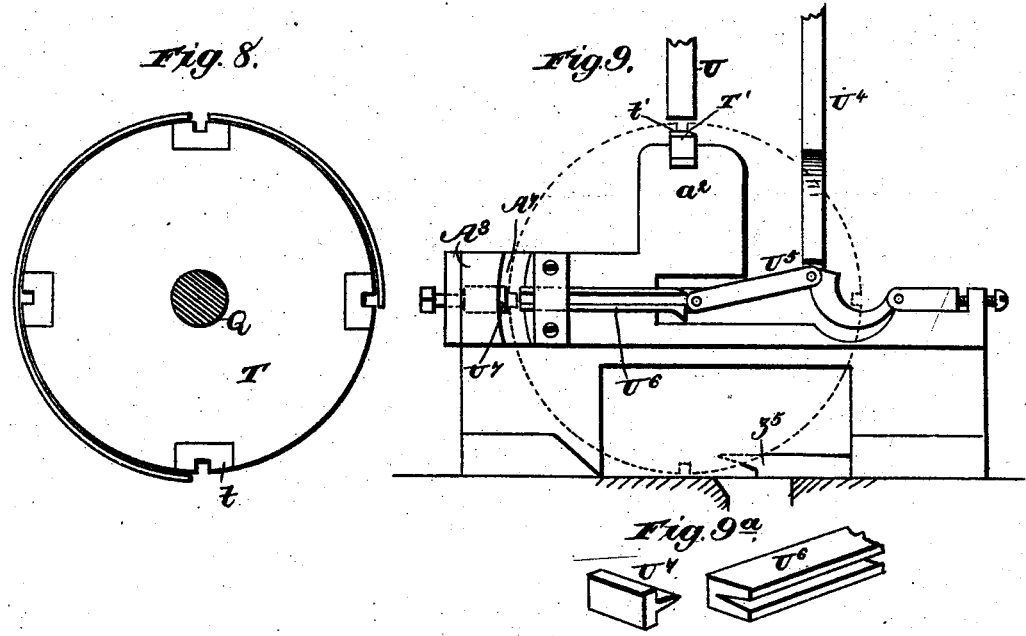
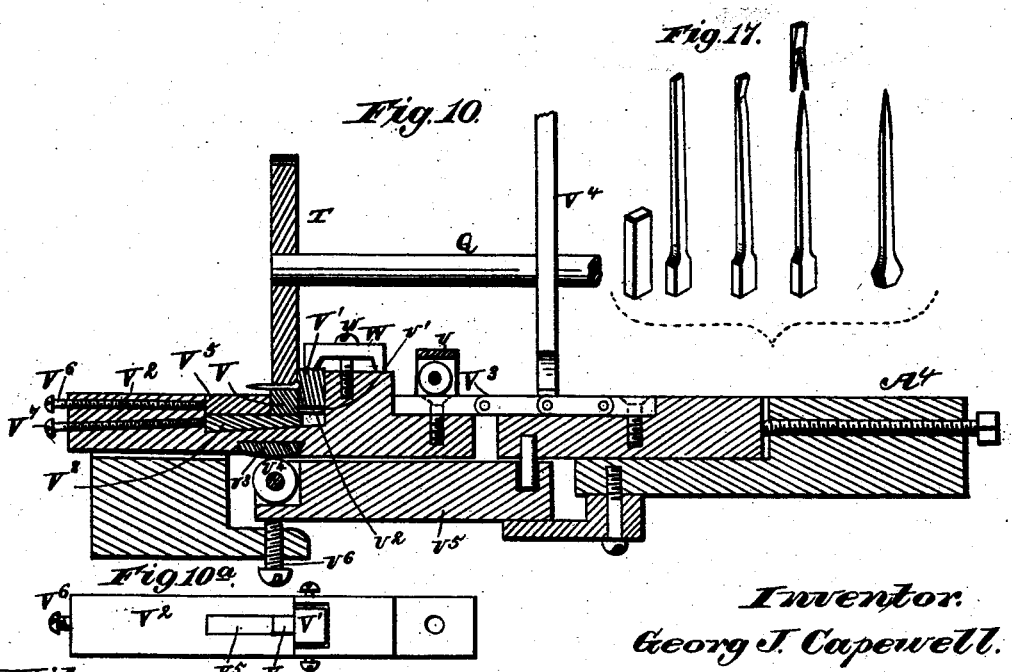

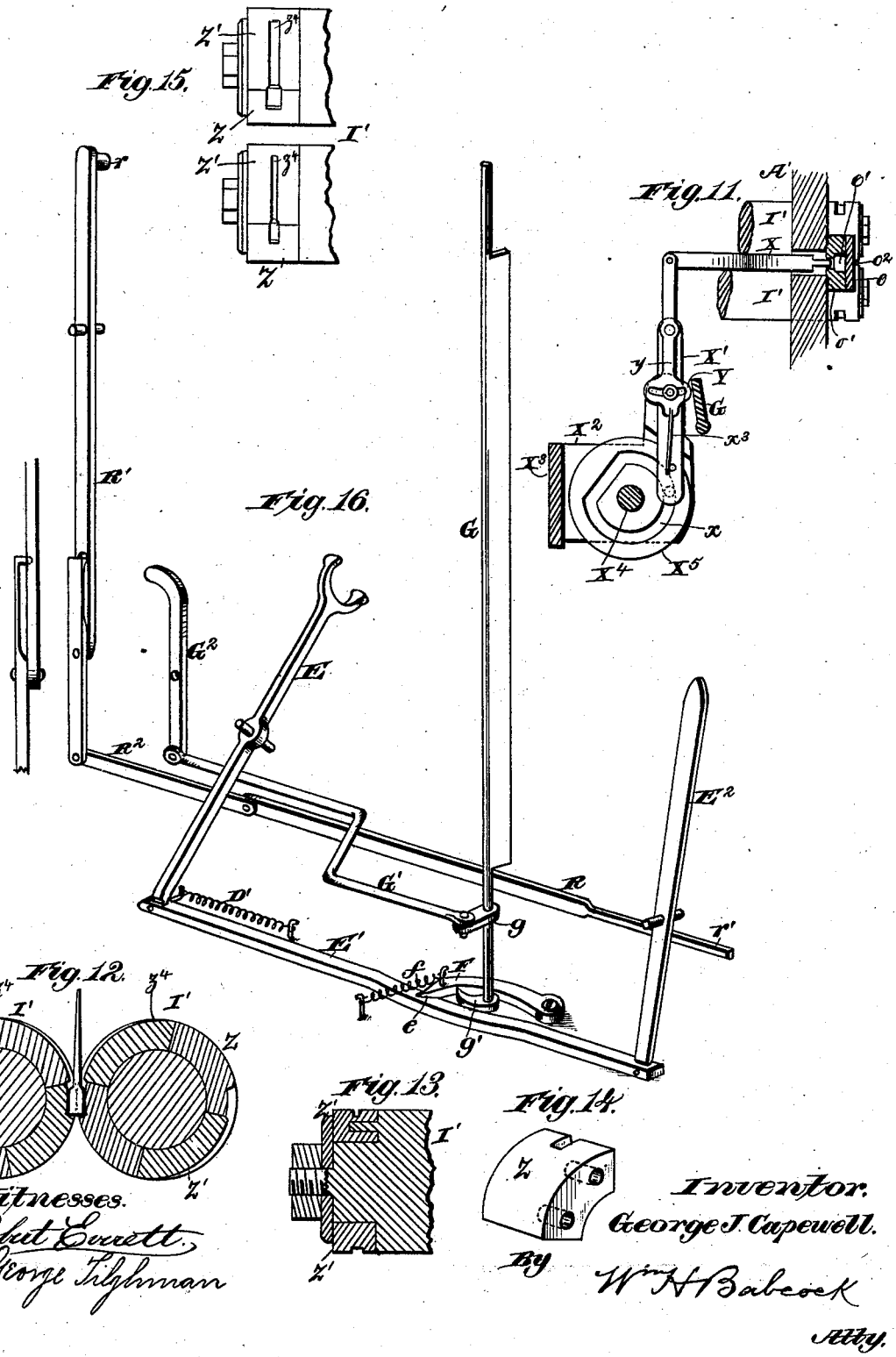

(Model.) 8 Sheets—Sheet 8.

G. J. CAPEWELL.
HORSESHOE NAIL MACHINE.

No. 292,201. Patented Jan. 22, 1884.

Witnesses.
Robert Everett.
George Tilghman

Inventor.
George J. Capewell,
By Wm H Babcock,
Attorney

UNITED STATES PATENT OFFICE.

GEORGE JOSEPH CAPEWELL, OF CHESHIRE, CONNECTICUT.

HORSESHOE-NAIL MACHINE.

SPECIFICATION forming part of Letters Patent No. 292,201, dated January 22, 1884.

Application filed April 30, 1883. (Model.)

*To all whom it may concern:*

Be it known that I, GEORGE JOSEPH CAPE-WELL, a citizen of the United States, residing at Cheshire, in the county of New Haven and State of Connecticut, have invented certain new and useful Improvements in Machines for Making Horseshoe-Nails; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

This invention relates to machines for making horseshoe-nails and other articles by passing bars or blanks of metal through pairs of die-grooved rolls, whereby the said blanks are compressed and shaped, the articles being afterward trimmed, pointed, and headed by suitable punches and dies.

The said invention consists, partly, in certain improvements in the devices for regulating the supply of blanks to the compressing-rolls and their passage from one pair to another pair of the latter; partly in certain improvements in the devices for trimming, heading, and finishing the articles; partly in certain improvements in the devices for shipping and unshipping the clutch which governs the action of the machine, and partly in certain subsidiary devices, and certain improvements in the rolls themselves, all substantially as hereinafter set forth and claimed.

Figure 1:
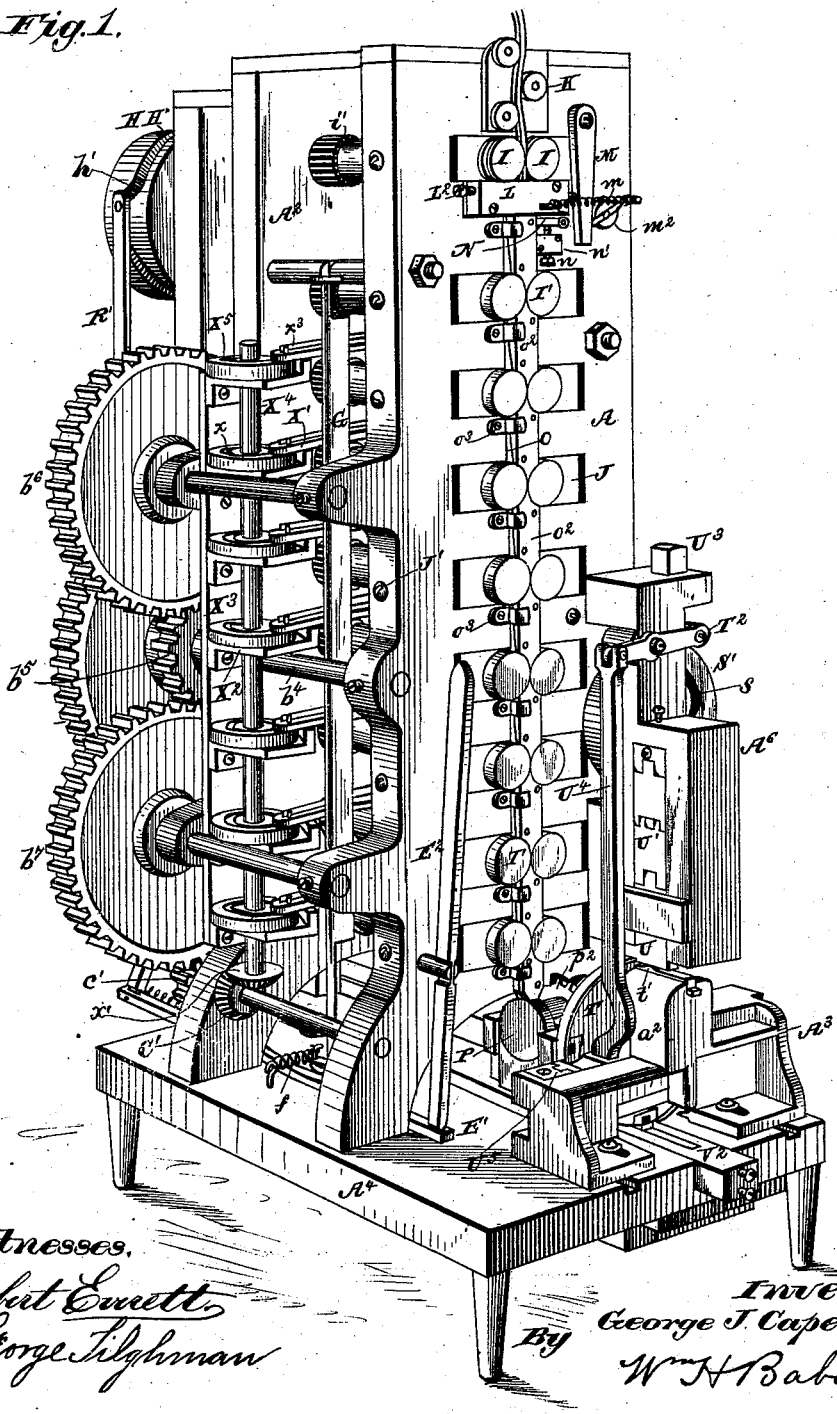
Figure 2:
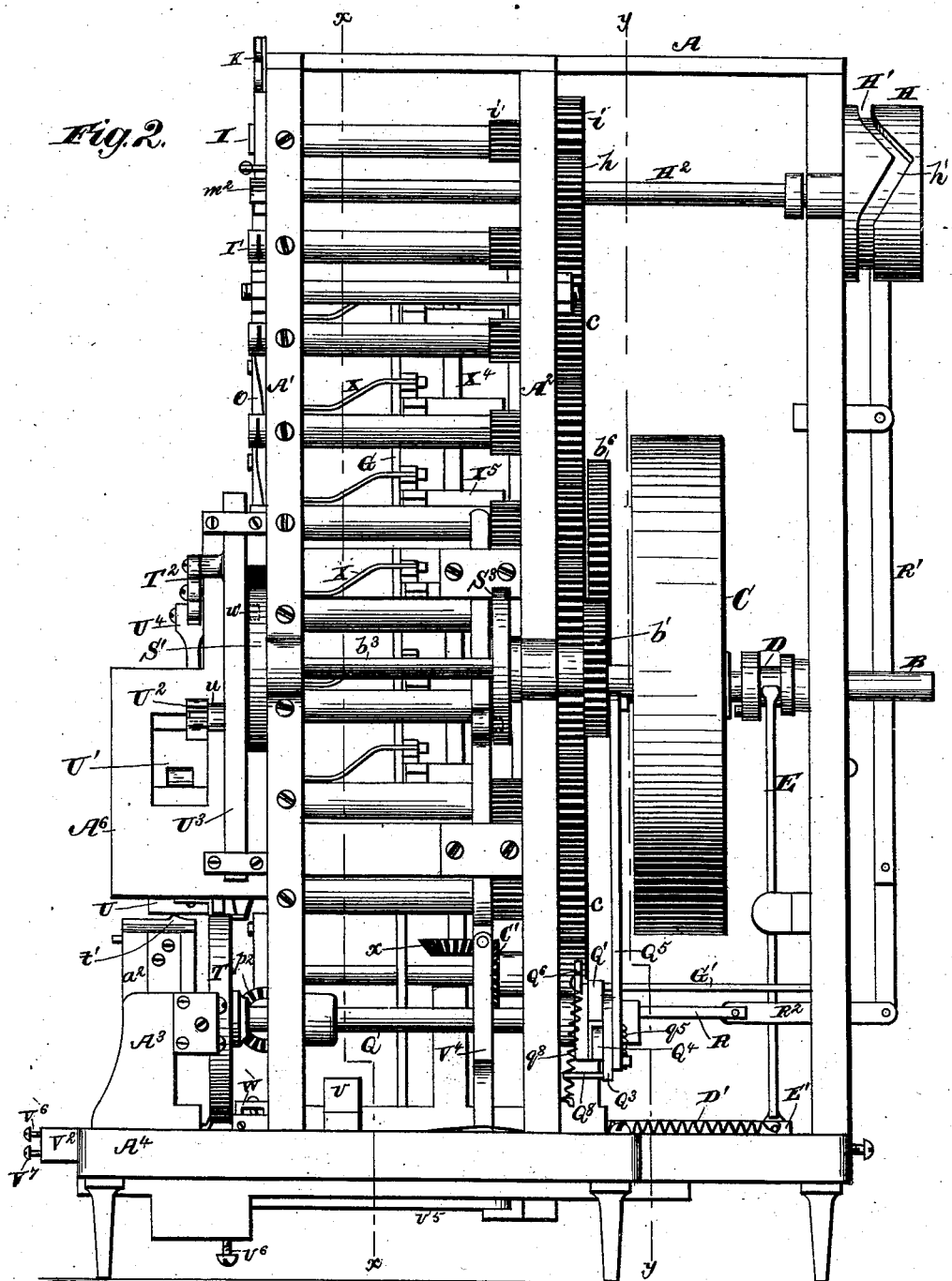
Figure 3:
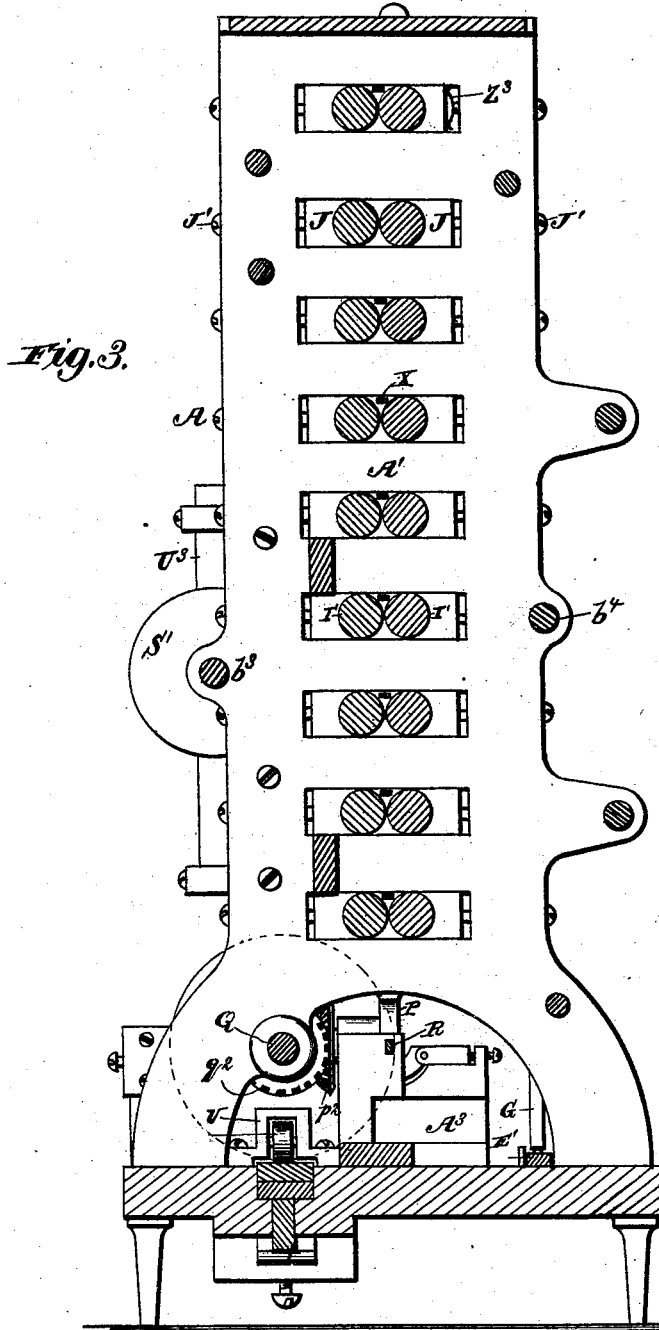
Figure 18:
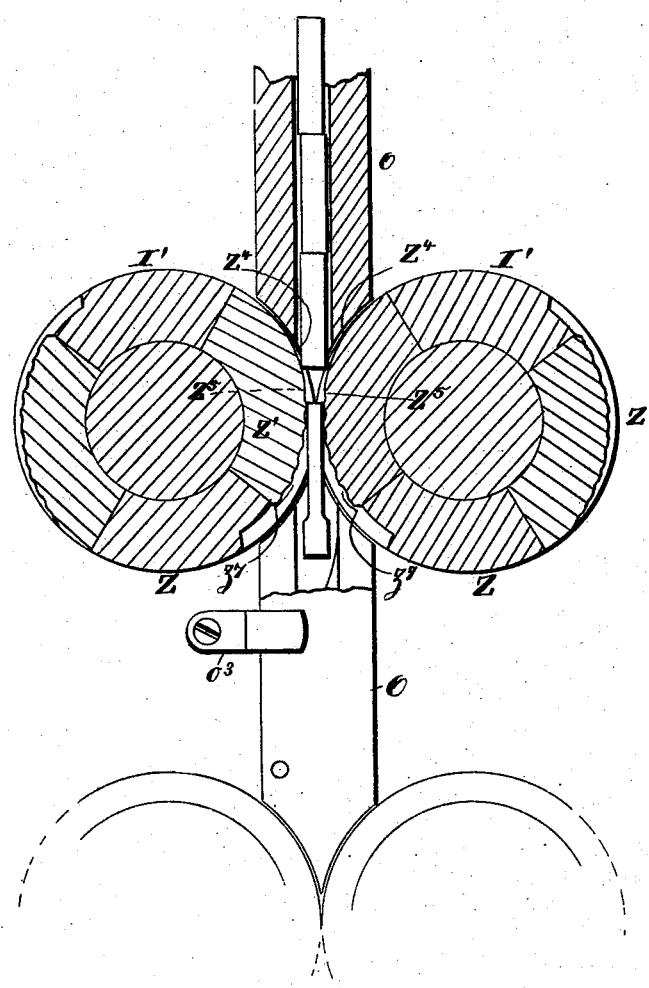

In the accompanying drawings, Figure 1 represents a perspective view of a machine embodying my invention, taken from the corner nearest the clutch-shipping lever and at the front of the machine, where the compressing-rolls are located. Fig. 2 represents a side elevation of a machine embodying my invention on the side opposite to the cams which operate the movable gates in the guideway. Fig. 3 represents a vertical section on the line $xx$ of Fig. 2, the bars $x$, hereinafter described, being shown a very little lower than in Fig. 2. Fig. 4 represents a vertical section on the line $yy$ of Fig. 2, the rod $G'$, hereinafter described, being omitted from this figure in order that the wheel $P$, also hereinafter described, may appear more plainly. Fig. 5 represents a detail vertical section through the feed-rolls and the cutting and regulating devices at the top of the guideway, the first section of the latter being shown uncovered. Fig. 6 represents a detail vertical sectional view of the wheel which receives the blanks from the compressing-rolls in an incomplete condition. Fig. 7 represents a detail vertical section, at right angles to that shown in Fig. 6, through said wheel, and a part of the feeding-plunger and other proximate devices. Fig. 8 represents a detail side elevation of the die-wheel which receives the blanks from the former-wheel and presents them to the plungers—beveling, pointing, and heading. Fig. 9 represents a detail view, taken from the inner side, of the devices for beveling and pointing the blanks and discharging them from the machine, the die-wheel being shown in dotted lines. Fig. $9^a$ represents a detail view of the pointing-die and plunger. Fig. 10 represents a vertical longitudinal section through the slide which carries the heading and clamping dies, the die-wheel, and certain proximate devices, some of the latter being shown in external elevation. Fig. $10^a$ represents a plan view of the said slide and the heading and clamping dies secured thereto. Fig. 11 represents a detail plan view, partly in section, of the devices for regulating the passage of the blanks through the guideway from one pair of rolls to another, said view showing also portions of a pair of rolls and the framework, the guideway, and vertical rock-shaft, hereinafter described. Fig. 12 represents a vertical transverse section through a pair of compressing-rolls having a blank between them, the receiving-pocket for the head of the blank being shown larger than said head, to allow the latter to slip down. Fig. 13 represents a vertical longitudinal section of a part of a compressing-roll and the dies countersunk therein, as in Fig. 12, showing the studs or pins whereby said dies are fastened to said roll. Fig. 14 represents a detail perspective view of one of the dies, showing the recesses or sockets in its side for receiving said studs or pins. Fig. 15 represents a detail side elevation of the operative ends of two rolls— one belonging to an upper pair and the other to the pair next below—one showing a groove for operating on the edge of a blank, the other a groove for operating on the side of a blank. Fig. 16 represents a detail view of the feeding-plunger, its yielding-lever, and the automatic unclutching devices. Fig. 17 represents the blanks in their several stages, and Fig. 18 represents a view of the first pair of rolls refusing a second blank while compressing a blank.

A designates the frame of the machine; B, the driving-shaft journaled therein; C, a driving-wheel mounted loosely on shaft; D, a clutch splined on said shaft, and adapted to be thrown into or out of engagement with said wheel; E, a lever, which has the usual yoke-and-groove connection with said clutch; and E', a rod or bar extending from the lower end of said lever to the lower end of a shipping-lever, E², adapted to be operated by hand to throw said clutch in or out of engagement with said wheel, as desired. When thrown out of engagement, it of course does not receive rotation from the wheel, and the machine does not operate. The rod or bar E' has a notch, c, in its side. This notch is adapted to receive a dog or detent, F, which is forced into the same by a spring, f, whenever said rod is moved, so as to throw the clutch into engagement with the wheel, and said dog then effectually locks the two latter parts together. To release said rod or bar E' from said spring-pressed dog, I make use of a vertical rock-shaft, G, having arms $g\ g'$. The former arm has a connecting-rod, G', attached to it, the other end of this rod being connected to a lever, G², so that when the latter is moved on its fulcrum it will give partial rotation to said rock-shaft. The arm $g'$ is arranged to come into contact with the inner side of dog F, and force the latter outward when said shaft is turned in one direction, thus removing it from the notch c.

When it is desired to stop the machine, the lever G² is first operated to remove dog F, as stated, from its engagement with bar or rod E'. The clutch D is then moved away from wheel C. This may be done by the shipping-lever, as before stated; but I prefer to make the unshipping of the clutch automatic. This is accomplished by means of a retracting-spring, D', operating on lever E.

A pinion, b, on shaft B, gears with and drives two gear-wheels, $b'\ b^2$, arranged on opposite sides of said pinion, and mounted on shafts $b^3\ b^4$, which are journaled in frame A, and turn with said wheels, respectively. The shaft $b^4$ of gear-wheel $b^2$ carries a pinion, $b^5$, which gears with two wheels, $b^6$ and $b^7$, which are mounted on shafts that have no further function. The upper wheel, $b^6$, gears with and drives two of the pinions c of the compressing-rolls, hereinafter described. The lower wheel, $b^7$, in like manner meshes with and drives two more of said pinions c, and a pinion, c', which turns a shaft carrying a bevel-wheel, C', the purpose of which will be hereinafter described. The remainder of the pinions c of the compressing-rolls are operated through the medium of those already referred to. The uppermost one of these pinions c gears with and drives a pinion, h, on a shaft, H², which carries a drum, H, having a cam-groove, H', in its periphery, for a purpose hereinafter explained. The said pinion h gears with and drives a pinion, i, on one of the feed-rolls I, the other feed-roll being driven by the intermeshing of cog-teeth $i'\ i'$, formed on said rolls or attached as pinions thereto. The same method is adopted with every pair of rolls in the machine, one roll being driven by gearing, and in its turn driving its fellow-roll by cog-teeth. All of the rolls are journaled at their front bearings in detachable blocks J, held in place in the frame by screws J'. The operative parts of said rolls protrude through the front of the frame in pairs, arranged one above another. Instead of continuing the rolls through to their rear bearings, they may terminate at or in their front bearings, and they may be mounted on shafts or formed therewith. For greater strength, however, it is best to make the shaft as thick as the roll in each instance, and the construction is then, in effect, that of a roll extended through the front wall, A', and the rear wall, A², of the frame A, as shown. Of course each pair of rolls may be made in sections, coupled in accordance with the well-known method shown in one of my former patents or by any other suitable means. The gearing above described may be considerably varied without departing from the spirit of my invention.

K designates three straightening-rolls, arranged, as if at the corners of a triangle, at the top of front wall, A'. They receive and straighten the bar or wire of metal as it is drawn from a coil represented in Fig. 5—that is, the wire is drawn through them by the action of feed-rolls I aforesaid, which are located under said straightening-rolls. Each of these feed-rolls is grooved peripherally; but the bottom of each groove of said roll is removed at two opposite parts of its circumference, so as to leave two opposite working-faces, $i^2\ i^3$. These close on the wire or bar with a yielding pressure, as hereinafter explained, but without compressing it, but tightly enough to feed it downward as the feed-rolls turn toward each other. There being two working-faces in each groove, the act of feeding takes place twice during each rotation of said rolls.

For cutting the metal in proper lengths, such as shown in Fig. 17, (first blank beginning at the left,) I employ a fixed blade, l, and a reciprocating plunger or cutting-blade, l'. The former is held within a casing, L, attached to the front wall, A', of frame A, and the plunger plays in and out horizontally through said casing. There is a vertical central passage, l², through said casing, and the outer part, L', of the latter, is made detachable, to allow inspection, cleaning, and repair of the interior and the devices contained therein. The blade $l$, though fixed with relation to the plunger when the latter is in operation, is made adjustable to take up wear by means of an adjusting-screw, $L^2$, which works through the end of said casing. The plunger is operated by a pendent lever or arm, M, and a retracting-spring, $m$. The former has a transverse screw, $m'$, passed through it and arranged to bear against the outer end of said plunger. Of course this screw is adjustable to take up wear. A collar, $m^2$, is provided with two horns, $h^3$, at opposite points of its periphery, and fastened on shaft $H^2$, hereinbefore mentioned. It will give, by its horns $h^3$, two forward motions to plunger $l'$ during each rotation of shaft $H^2$. The retracting-spring $m$ is shown as attached to a hook, which is rigid with said plunger, and protrudes through a horizontal slot in casing L; but this method of attachment is not indispensable. The wire passes down through passage $l^2$ between said plunger and the blade $l$, and each forward motion of the plunger severs a length by cutting into said wire or rod and forcing the wire or bar against the sharp edge of said blade, and dislodges said severed piece from the supporting-finger below described.

There is always some danger that too great a length of metal will pass down between the rolls I, so that the blanks or any given blank will be too long to be properly acted on by the compressing-rolls. To prevent this, I employ an approximately-horizontal finger, N, which is pivoted at one end to the face of the front wall, A′, and extends at the other end into a slot, $o$, in the side of the uppermost section of the guideway O, hereinafter described. This finger rests upon a stop-screw, $n$, which works up through a block, $n'$, and serves to adjust the inclination of said finger. The lower end of the metal rod or wire to be operated on rests upon this finger. When said finger is at its lowest position, it allows the maximum length of metal for a blank to descend below the cutting-blade. In proportion as it is inclined upward this length is lessened. The function of this finger is to enter the channel or passage O′ at the side thereof, and hold the rod, bar, or wire sufficiently to prevent it from slipping down between the working-faces $i^2$ or $i^3$ of the feed-rolls I, which have a yielding grasp upon it, owing to the pressure of a spring, $Z^3$, against the movable front bearing-block of one of said feed-rolls. This yielding grasp prevents the said feed-rolls from compressing the wire or rod which they feed. If there were no provision for yielding, any inequality in the wire would be flattened or pressed out of shape, thus unfitting the metal for the operation of the compressing-rolls. The facility of yielding also prevents injury to the rolls themselves or their journals or bearings in case any substance of unusual thickness and hardness occurs in the wire. After the severed length of metal has been dislodged from its rest on said finger, as stated, it falls into channel O by the action of gravity. The lengths of wire or bar metal cut off, as before described, constitute the blanks which are to be operated upon by the compressing-rolls I′. These are provided with peripheral die-grooves $I^2$, corresponding to the general shape of the article to be produced, and arranged so that their heads first turn together, and then the remainder of the grooves. The die-grooves $I^2$ of the several pairs of said rolls decrease in width and depth and increase in length as the pairs of rolls succeed one another going downward—that is, the die-grooves of the uppermost pair of rolls are broader and deeper than those of the pair next below it, but also shorter, and a similar difference exists between the second pair and the third, and so on. A guideway, O, before referred to, conducts the metal blanks from the cutting devices above described to the first pair of compression-rolls, and thereafter to each successive pair of the latter. The guideway O is divided into sections, one section being between each pair of the rolls. There is also a final section, which conducts the blanks (then having the form of the second blank illustrated in Fig. 17) from the lowest pair of compression-rolls to other devices, hereinafter described, whereby the blanks are finally shaped and completed. The passage O′ through said guideway is spiral or twisted, so as to present alternately the sides and the edges of the blanks to the action of the compressing-rolls. Each section of said guideway consists of an inner part, $o'$, which is permanently attached to wall A′ of the frame, and an outer part, $o^2$, which is fitted to said inner part by studs and recesses, and removably secured thereto by a catch or turn-button, $o^3$. The removal of this outer piece or cap allows the interior of the passage to be inspected, and any blanks removed or set straight which may have clogged it, also the removal of any foreign matters which may have intruded, or any necessary cleansing or repairs.

Immediately below the lowest section of guideway O is a wheel, P, having two passages, P′, through it at right angles to each other. These passages are successively presented under the guideway O, and receive the blanks as the latter descend from the rolls in an incomplete condition. To insure accuracy in their presentation to said wheel, the lowest section of said guideway is constructed with a straight vertical passage, which forms a continuation of the spiral or twisted passage O′. The blank, in approximately the form of a horseshoe-nail, then drops directly downward, head foremost, into the upper end of the passage P′, which is presented as stated. Said wheel P is mounted on a shaft, $P^2$, which carries a bevel-gear wheel, $p^2$, meshing with a similar bevel-gear wheel, $q^2$, on a shaft, Q, carrying a fast collar or drum, Q′. In the periphery of this collar or drum are four equidistant notches, $q^3$, and beside them are four equidistant teeth, $q^4$, having inclined faces in the direction of rotation, and radial or square faces in the opposite direction. A loose collar, $Q^2$, on shaft Q carries a radial arm, $Q^3$, to which the driving-dog $Q^4$ is hung. A retracting-spring, $q^5$, is attached at one end to said arm and at the other to said dog, and holds the latter in contact with the teeth $q^4$, the said dog alternately riding over the inclined faces of a tooth, $q^4$, in a backward direction till it drops behind the square rear face of said tooth, and then advancing in engagement therewith until it has turned said tooth and the shafts Q and $P^2$ and wheel P one-fourth of a rotation. The motion of dog $Q^4$ for feeding, as aforesaid, is communicated through a connecting-rod or pitman, $Q^5$, which is attached loosely at one end to said arm $Q^3$, and at the other end to a crank-pin on gear-wheel $b'$, before mentioned, which is mounted on the shaft $b^3$, that carries the cam-wheels for actuating the heading and pointing plungers. $Q^6$ and $Q^7$ designate, respectively, two retaining-pawls, which are pivoted at their rear ends side by side to the rear wall, $A^2$, of frame A, and provided with teeth $q^6 q^7$, arranged to drop side by side into each of the notches $q^3$ as the latter are successively presented. The tooth $q^7$ of pawl $Q^7$ is inclined on its rear face, so that this pawl will be automatically raised by the collar or drum $Q'$ as the shaft Q turns forward, but will prevent the backward turning of said shaft. The tooth $q^6$ of the other retaining-pawl, $Q^6$, is square at each face and locks the shaft Q, so that the latter cannot turn forward until this pawl is raised. Arm $Q^3$ is provided with a horizontally-extending rigid pin, $Q^8$, which is adapted and arranged to engage the extended outer end of pawl $Q^6$ and lift the same, so as to raise the tooth $q^6$ out of the notch $q^3$ just as the feeding-dog reaches the end of its backward movement and drops behind the tooth on which it is to operate. A retracting-spring, $q^9$, draws pawl $Q^6$ down, so as to force its tooth $q^6$ into each notch $q^3$ as the latter is presented. The order of operation is for the feeding-dog to ride backward over the inclined face of a tooth, $q^4$, on collar or drum $Q'$. Then said dog drops behind said tooth, and the pin $Q^8$ on arm $Q^3$ lifts pawl $Q^6$, so as to raise tooth $q^6$ out of notch $q^3$. The feeding-dog then advances, the collar $Q'$ automatically lifts the pawl $Q^7$ out of notch $q^3$, and the shaft Q transmits its rotary motion to the shaft $P^2$ and wheel P. This motion continues until a quarter of a circle has been traversed. The feeding-dog then ceases to feed and moves backward, leaving the wheel P temporarily stationary, with the blank (received as before described) held horizontally, point foremost. The object of said wheel P is to change the position of the blank in this manner, in order that it may be conveniently delivered to the devices for beveling, pointing, and heading. This delivery is effected by means of a longitudinally-reciprocating horizontal plunger, R, which is operated by a vertical lever, $R'$, of the first kind, through a connecting-link, $R^2$. The upper end of said lever is provided with a lateral stud, $r$, which enters cam-groove $H'$ in drum H, above described. This groove turns outwardly at two different points, $h' h'$, as shown in Figs. 1 and 2, the remainder of the groove being in the curve of a true circle. These outward bendings will give two forward motions of the plunger to each rotation of drum H. The said plunger is made very slender at its forward end, $r'$, so that it may enter the passage $P'$ of wheel P, which contains the nail-blank before referred to, and force the latter out point foremost at the other end of said passage. The said plunger operates strictly in a horizontal plane, with no need for any motion but simple reciprocation. Of course it might be arranged to operate vertically or obliquely instead without departing from my invention, provided the motion be a simple longitudinal reciprocation.

The lever $R'$ is made in two pieces, which are pivoted together at the lower end of the upper piece and the middle of the lower piece. The upper end of the lower piece is provided on its inner face with a rounded shoulder, which fits into a corresponding recess in the proximate face of the upper piece. The elasticity of the metal holds them together ordinarily as one piece; but allows them to separate at this point when the plunger meets with an obstruction. The upper end of the lower section or piece of lever $R'$ is then forced against lever $G^2$ by the strain exerted by cam-grooved drum H on lever $R'$, and the rock shaft or bar G and arm $g'$ are moved thereby, so as to free bar $E'$ from dog F, and the clutch is unshipped by spring $D'$. The blank, when thrust by said puncher out of wheel P, enters one of four dies, $t$, which are located at equal distances in the periphery of a large wheel, T, carried by shaft Q aforesaid, and of course having the same step-by-step motion as said wheel P. As these wheels P and T are in vertical planes at right angles to each other, the nail-blank enters wheel T from the inner side and protrudes through the outer side thereof, it being prevented from passing entirely through by its head, which will not enter the recess in said die. The next quarter-rotation of said wheel T brings the point of the blank immediately above a fixed beveling anvil, $T'$, having an inclined raised rib or die, $t'$, on its top arranged transversely. This anvil is of hardened steel, set into a recess in the top of a raised block or casting, $a^2$, forming part of a supplement frame, $A^3$, secured to the bed $A^4$ of the main frame A.

U designates a beveling-plunger, which descends vertically upon the imperfect point of the blank as it rests upon the beveling-die $t'$, and presses it into the beveled shape shown in the third blank of Fig. 17. This plunger is guided in a vertical frame, $A^6$, secured to front wall, $A'$, of main frame A. Toggle-arms $U'$, guided in frame $A^6$, operate this plunger, and they are alternately bent and straightened by the action of a bell-crank lever, $U^2$, which is loosely connected at its outer end to a wrist-pin, $u$, on the side of a vertically-reciprocating slide-bar, $U^3$. The vertical motion of this slide-bar is given by a cam-grooved wheel, $S'$, carried by shaft $b^3$ aforesaid, the groove $s$ of said wheel receiving a wrist-pin, $u'$, on said slide-bar, and bending inward at one part of its circumference, said shaft $b^3$ and wheel $S'$ making two rotations for each rotation of the rolls, so as to actuate said beveling-plunger twice during each rotation of said rolls. The next quarter-rotation of said wheel T carries the blank around, so that its point is within a channel, $A^7$, formed in the inner face of supplemental frame $A^3$. During this passage of the nail-blank from the beveling-anvil and punch to the channel aforesaid it is prevented from falling out of die $t$ by a curved plate, which extends around wheel T, except at the bottom and a small space at the top, where it is attached to frame $A^6$. It is also attached at the bottom to bed $A^4$ of frame A.

$T^2$ designates a lever of the first kind, arranged horizontally and pivoted on a stud attached to frame $A^6$. One end of this lever is loosely connected to a stud or wrist pin on the side of slide-bar $U^3$, the other end of said lever being similarly connected to a pitman, $U^4$, which operates toggle-levers $U^5$, whereby a pointing-plunger, $U^6$, is reciprocated in the channel $A^7$. This plunger forces the point of the blank against a V-shaped stationary die, $U^7$, held within the frame $A^3$. This plunger is provided with a V-shaped groove, as shown in Fig. $9^a$, and the cutting edges or blades of said plunger and said die trim the point, so as to remove all surplus metal and give it a perfect shape, as illustrated in the fourth form of blank shown in Fig. 17. The next rotation of wheel T carries the blank around to the lowest point of its revolution. Here it is held between die $t$ aforesaid and a clamping-die, V, which is brought against it from below, while a heading-die, V', having a recess corresponding to the proper shape of a horseshoe-nail head, is forced against the head of said blank. These three dies V, V', and $t$, by their pressure on said blank, complete the head and the general shape thereof. The dies V V' are carried by a longitudinally-reciprocating slide, $V^2$, which is operated by a toggle, $V^3$, both said toggle and said slide being in a guideway of the bed $A^4$. This toggle is worked by a slide-bar, $V^4$, which is guided in blocks attached to the frame A and raised and lowered by a wheel, $S^3$, on shaft $b^3$. This wheel has in its inner face a cam-groove corresponding in shape to the groove $s$ of wheel S. Thus at each rotation of said wheel $S^3$ the slide $V^2$ is reciprocated, and the heading-dies are caused to act on a blank. This slide is prevented by a guide-block, $v$, from leaving the bed $A^4$; but said block allows the rear end of said slide to rise with toggle $V^3$ and vertical slide-bar $V^4$. This upward motion of the rear end of the slide $V^2$, of course, throws down the forward end of said slide, said slide fulcruming against an anti-friction roller attached to the under side of guide-block $v$, and this downward motion removes die V from the blank simultaneously with the lateral removal of die V' therefrom. This compound upward and downward and backward and forward motion of said slide adapts it to present properly against the head of the blank both the vertically-operating clamping-die and the horizontally-operating heading-die, and also to remove both of these dies therefrom, as described. The die V' is held to said slide by a clamping-plate, W, through which a screw, $w$, passes into said slide. This die sets within a recess, $v'$, at the forward end of a raised part of said slide, and upon lateral shoulders $v^2$, which leave a space between them and below said block. The clamping-die V is held between a block, $V^5$, and die V', said block being forced against said clamping-die by a screw, $V^6$. A wedge, $V^8$, is interposed between the bottom of die V and the material of the slide, and may be forced farther inward for tightening said die, the space between shoulders $v^2$ allowing this motion of said wedge. A screw, $V^7$, is the means used for forcing in said wedge. Like screw $V^6$, it works through the end of the slide. The latter is recessed, to allow the countersinking of die V and block $V^5$, and to allow the insertion of said wedge. For the purpose of lessening friction, said slide is provided on its bottom with a smooth plate, $v^3$, of hard steel, and this is in contact with an anti-friction roller, $v^4$, which is journaled in a frame or block, $v^5$, that is vertically adjustable in bed-plate $A^4$ by means of a screw, $v^6$. After the operation of the heading and finishing dies, already described, the wheel T begins another quarter-revolution. This motion brings the slightly projecting head of the nail against a fixed clearer, $z^5$, which forces it out of the die $t'$. It then drops through an opening in the bed-plate $A^4$.

To prevent the nail-blanks from crowding one another, so as to clog the passage $O'$ in guideway O, I employ a set of slides, X, which play in and out in said passage or channel above each pair of compressing-rolls, respectively, the upper pair alone being excepted. Each of these slides is operated by one of a series of levers, X', pivoted on one of a series of brackets, $X^2$, which are attached to a plate or wall, $X^3$, that is secured to or forms part of the frame of the machine. A shaft, $X^4$, arranged vertically within said frame, has its bearings in said brackets, and carries a series of horizontal wheels or disks, $X^5$, one for each lever X'. The upper face of each wheel is provided with a cam-groove, $x$, which receives a stud on the under side of the outer end of its appropriate lever X'. These grooves are so arranged that they will operate to force each slide into the channel $O'$ immediately after the pair of rolls just below have received a nail-blank from the said channel or passage $O'$. The shaft $X^4$ carries a bevel-pinion, $x'$, which meshes with bevel-pinion C', before mentioned, whereby said shaft is turned.

To guard against accidents, each lever X' consists of two pieces held together by a stiff spring, X³, which will yield when the slide X, attached to said lever, encounters any considerable resistance (such as would be afforded by a blank) in entering guideway O.

Of course the blanks follow one another closely, and the various operations hereinbefore described all go on together, though applied to different blanks. Thus one nail is discharged from the machine, while another is headed, a third pointed, a fourth beveled, several others passed through the compressing-rolls, and a bar for another cut off above said rolls. The operation of the various parts of the machine has been unavoidably so fully described in describing these parts themselves that very little further explanation seems necessary. Each pair of rolls, as shown in Figs. 1, 5, 12, 13, 14, and 15, is constructed with two die-grooves, which register, respectively, with those in the companion roll making the pair. One of the pairs of grooves thus formed in each pair of rolls is intended to act on the sides of the blanks and the other pair to act on the edges thereof. The spiral or twisted passage O' presents each blank to the successive pairs of compressing-rolls with the sides and the edges of said blank in position to be acted on alternately. This insures the equal compression of all parts of the blank. The blanks as they drop from the cutting-blade to the rolls are held back by the person running the machine until several blanks are accumulated in said guideway above the first pair of compressing-rolls, the object of this accumulation being that their combined weight may cause them to feed better through said compressing-rolls. This accumulation is needed above the first pair of compressing-rolls and there only, because the blanks, as they are cut from the rod or wire, are flat and oily, and therefore tend to stick to the inside of the guideway. Of course the flat blanks thus accumulated above the first pair of compressing-rolls tend to follow one another into the die-grooves of said rolls. To prevent this I employ the following shape or construction for said die-grooves, as illustrated in Fig. 18. Each die-groove of said first pair of compressing-rolls has its rear end made to gradually shallow from the point $z^5$, where compression ends, to the rear end of the groove. The inclined part $z^4$, thus formed, does not compress or shape the blank, but merely serves to expel a second blank which crowds after the first, so as to insure that only one blank will be grasped by the said rolls at a time. The inclined parts $z^5$ of the die-grooves, closing together, expel a blank which endeavors to follow the one then undergoing compression by said rolls, as illustrated in Fig. 18. The part of the groove which does the compressing is marked with slight transverse flutings, and lettered $z^7$. Each die-groove of the compressing-rolls has a pocket at the head end, which is deeper than the rest of the groove, so as to receive the head of the blank without compressing it, and larger than the head of the blank, in order that said head may freely slip to the bottom of said pocket by its own gravity. This prevents any part of the said head from being in position to be compressed, and thereby forming fins, which would afterward clog the machine. Such accidents may easily happen when the pocket or receptacle for the head is no larger than said head, for the latter may stick without quite reaching its proper position. The die-grooves may be made in the solid bodies of the rolls; but I prefer, as a rule, to make them in dies Z Z', which are countersunk in the periphery of each roll, and attached thereto by pins and sockets or recesses. As shown in Fig. 12, each die-groove is partly in die Z and partly in die Z', the line of meeting of said dies being at the point where compression begins, or at some point between this point and the forward end of the pocket, the term "forward" being used with relation to the direction of rotation. When thus constructed, the dies do not expose their joints to the strain of metal which would be compressed against the edges of said joints and tend to enter the latter.

The rock-shaft G is of such width that it may be engaged and turned by a shoulder, Y, on the inner spring-pressed part, $y$, of any one of the levers X', thereby freeing detent F from bar E'. Each lever X' has one of these shoulders. Consequently whenever any slide X encounters a blank the spring D' is allowed to move clutch D away from driving-wheel C, and thereby stop the machine.

Of course, instead of the fixed blade $l$ and the movable cutting-blade $l'$, a fixed block or stop may be used with a movable cutting-blade, or a fixed blade may be used with a movable plunger which does not cut; but the two cutting-blades, acting together, as shown and described, are more satisfactory.

It is not indispensable to have the feed-rolls cut away at opposite points or at any points of their grooves, as the feed-rolls are adapted to yield, as stated. They would, if left with continuous bearing-faces, simply feed the wire or rod of metal against the adjustable finger, and then, yielding, turn against the sides of said wire or rod without feeding it further until the wire or rod is dislodged from said finger, as aforesaid.

Of course many other parts of my mechanism are susceptible of considerable modification without departing from the spirit and scope of my invention.

Having thus fully described my invention, what I claim as new, and desire to secure by Letters Patent, is—

1. As an improvement in the art of manufacturing horseshoe-nails, the particular adaptation, herein described, of the nail-blank and dies to one another for the purpose of enabling the latter to expel a second blank, which consists in providing blanks of such size as to fill the die-grooves approximately to a point where it is desired that compression shall end on the first blank, said die-grooves being provided with an inclined extension from such point, acting to reject the second blank, substantially as described.

2. In a machine for making horseshoe-nails, a set of rolls for compressing the blanks, each of these rolls having dies set into its periphery or fastened thereon, these dies having die-grooves in their faces, the line of junction or contact of the dies passing through the point in the groove where the pressure or pinch begins or at any point between it and the large end of the pocket which receives the head of the blank.

3. A pair of compressing-rolls provided with die-grooves having at their large ends pockets which are deeper than the remaining parts of said grooves and larger than the heads of the blanks.

4. In a machine for making horseshoe-nails, a clutch for engaging the driving-wheel, and thereby turning the driving-shaft, in combination with a device for disengaging said clutch from said wheel, a dog or detent which normally prevents this disengagement, and devices which automatically remove said dog or detent when the blanks become clogged in the guideway.

5. In combination with a series of compressing die-grooved rolls and a guideway which conducts the blanks to and from each pair of said rolls, a series of slides working into and out of the said guideway between each pair of said rolls, and a series of cams and levers actuating said slides, each one of these levers being made in two sections, which are adapted to yield on encountering a blank or other obstacle, substantially as set forth.

6. In combination with a series of compressing die-grooved rolls and a guideway which conducts the blanks to and from each pair of said rolls, a series of slides working into and out of the said guideway between each pair of said rolls, a series of sectional yielding levers for operating said slides, and devices which permit the automatic unshipping of the clutch which drives the machine when a shaft or bar forming part of said devices is engaged by a shoulder on any one of said levers in the act of yielding, as aforesaid.

7. In combination with the driving-wheel, driving-shaft, and the clutch for connecting and disconnecting them, the shipping-levers and notched connecting rod or bar for operating said clutch, the retracting-spring for unshipping the same, the spring-pressed dog, which engages with said notch to lock said clutch against the action of said unshipping-spring, and a lever and a shaft and arm operated by said lever for removing said dog from said notch, substantially as set forth.

8. In combination with the feeding-rolls and compressing-rolls, an interposed cutting-blade and sliding plunger, a pendent arm carrying a piece arranged to be forced against the outer end of said plunger, and a shaft carrying two horns or cams, which act on said pendent arm, substantially as set forth.

9. The combination of a pair of feed-rolls with a set of compressing devices, a cutting blade or blades, and an adjustable finger, which supports the end of the wire or bar and regulates the length of the blanks, substantially as set forth.

10. A circular plate or wheel provided with cross-passages having four equidistant openings in its periphery, in combination with compressing-rolls and a guideway discharging into said passages as they successively assume a vertical position, and devices which give said wheel a step-by-step motion of one-fourth of a circle at each step, for the purposes set forth.

11. A rotary wheel and devices for giving it a step-by-step motion of one-fourth of a circle at each step, said devices consisting of a ratchet or notched collar on a shaft whereby said wheel is rotated, driving and retaining pawls, and the necessary operating and freeing devices, whereby said shaft is given its step-by-step motion, in combination with devices for beveling, pointing, and heading the blanks carried by said wheel as they successively reach the points where said devices are respectively located.

12. A wheel rotating with a step-by-step motion and adapted to carry the blanks with their ends protruding, as stated, in combination with a beveling-anvil and punch or plunger which bevel the end of the blank, substantially as set forth, and the notched and toothed collar Q' on the shaft of said wheel, a loose collar carrying the driving-dog $Q^4$, means for alternately advancing and withdrawing this dog to rotate the former collar step by step, and the two retaining-pawls, and means for automatically freeing the same, as stated.

13. A wheel rotating with a step-by-step motion and adapted to carry the blanks with their ends protruding, as stated, in combination with a stationary blade and a plunger, whereby the surplus metal is trimmed from the point after the latter has been beveled, as set forth, and the notched and toothed collar, driving-dog, retaining-pawls, and actuating and freeing devices, substantially as described.

14. A wheel provided with heading-dies arranged transversely to the periphery of the wheel which receives the blanks of metal and carries them round in a step-by-step motion, in combination with a heading-die and a clamping-die, which are carried against said blanks, substantially as set forth.

15. A wheel provided with heading-dies which receive the blanks of metal, in combination with a slide carrying a heading-die, and a clamping-die, and devices which give to said slide a compound, lengthwise, and upward and downward motion, in order that the same slide may apply to and remove from the blank both the vertically-operating clamping-die and the horizontally-operating heading-die, substantially as set forth.

16. In combination with a vertical wheel arranged to receive the blanks from the guide-way, rotating with a step-by-step motion, and provided with passages extending through it, as stated, and a second wheel arranged horizontally and having corresponding rotation, a plunger and operating devices whereby said plunger is caused to pass through said passages as they are successively presented, and force the blanks therefrom into the dies or receptacles of the horizontal wheel, for the purpose set forth.

17. A feeding-plunger which operates on the blanks after they have left the compressing-rolls, in combination with unclutching mechanism for stopping the machine, a detent which prevents the operation of said unclutching mechanism, and a device connected to said feeding-plunger which removes said detent when said plunger meets with an obstruction, substantially as set forth.

18. A feeding-plunger and its operating-lever, the latter being in two normally-rigid sections, which are adapted to yield and separate at the upper end of the lower section when said plunger meets with resistance, in combination with a clutch and its unshipping-spring, and devices for allowing said spring to operate, the latter devices being operated by the engagement of the lower section of said lever therewith when its upper end separates from the upper section, substantially as set forth.

In testimony whereof I affix my signature in presence of two witnesses.

GEORGE JOSEPH CAPEWELL.

Witnesses:
CHARLES P. HOWARD,
FRANK L. HOWARD.